(12) United States Patent
Schmidt et al.

(10) Patent No.: US 7,936,790 B2
(45) Date of Patent: May 3, 2011

(54) SYNCHRONIZING RELATED DATA STREAMS IN INTERCONNECTION NETWORKS

(75) Inventors: Brian K. Schmidt, Sunnyvale, CA (US); J. Duane Northcutt, Menlo Park, CA (US)

(73) Assignee: Silicon Image, Inc., Sunnyvale ( * ) Notice: Subject to any disclaimer, the term of this patent is extended or adjusted under 35 U.S.C. 154(b) by 263 days.

(21) Appl. No.: 11/848,153

(22) Filed: Aug. 30, 2007

(65) Prior Publication Data

US 2009/0059962 A1 Mar. 5, 2009

(51) Int. Cl.
*H04J 3/06* (2006.01)
(52) U.S. Cl. .......................... 370/503; 370/516
(58) Field of Classification Search .................. 370/503, 370/516, 519
See application file for complete search history.

(56) References Cited

U.S. PATENT DOCUMENTS

| 6,212,233 | B1 * | 4/2001 | Alexandre et al. | 375/240.03 |
|---|---|---|---|---|
| 7,444,419 | B2 * | 10/2008 | Green | 709/231 |
| 2004/0228367 | A1 * | 11/2004 | Mosig | 370/503 |
| 2007/0280361 | A1 * | 12/2007 | Kwon et al. | 375/259 |
| 2008/0109865 | A1 * | 5/2008 | Su et al. | 725/116 |
| 2008/0162665 | A1 * | 7/2008 | Kali | 709/217 |

FOREIGN PATENT DOCUMENTS

| EP | 1398931 | 3/2004 |
|---|---|---|
| EP | 1523171 | 4/2005 |
| WO | WO-2006126852 | 11/2006 |

OTHER PUBLICATIONS

"8029P024PCT Search Report / Written Opinion Mailed Sep. 2, 2008 for PCT/US2008/069446", Whole document.
Fasbender, Andreas, et al., "On Assessing Unidirectional Latencies in Packet-Switched Networks", *Communications, 1997, ICC '97 Montreal Towards the Knowledge Millenni UM.*, IEEE International Conference, (Jun. 8, 1997), 490-494.
Int'l Preliminary Report on Patentability mailed Mar. 11, 2010 for Int'l Application No. PCT/US2008/069446.

* cited by examiner

*Primary Examiner* — Huy D Vu
*Assistant Examiner* — Maria Sekul
(74) *Attorney, Agent, or Firm* — Blakely Sokoloff Taylor & Zafman

(57) ABSTRACT

A method and apparatus for synchronizing related data streams in interconnection networks. Some embodiments of an apparatus include a transmitter to transmit a data stream to a second apparatus, where the transmitter transmits a data packet to the second apparatus. The apparatus further includes a clock, with the apparatus providing a first timestamp for the data packet using the clock upon transmission of the data packet. The apparatus includes a receiver to receive responses from the second apparatus, with the apparatus providing a second timestamp upon receiving a returned packet from the second apparatus, with the returned packet containing timestamps for the receipt and transmission of the packet by the second apparatus. The apparatus includes a network unit to direct the operation of the apparatus, the network unit to determine a start time for decoding of the data stream by the second apparatus based at least in part on the timestamps for the packet.

19 Claims, 8 Drawing Sheets

SYNCHRONIZING RELATED DATA STREAMS IN INTERCONNECTION NETWORKS

TECHNICAL FIELD

Embodiments of the invention generally relate to the field of networks and, more particularly, to a method and apparatus for synchronizing related data streams in interconnection networks.

BACKGROUND

A network may include the interconnection of multiple devices, such as personal electronic entertainment devices. In such a network, interconnected devices may share data, including the sharing of related streams of data. A transmitting device may include data that is to be streamed to multiple devices. In one example, the transmitting device may be a device containing or having access to a set of media data, such as a motion picture or other audio-visual data, that is to be streamed for display or other use by one or more display devices, with the display devices possibly including screens for display of video, speakers for production of audio, or both. For simplicity in terminology, any use of streamed data may be referred to as the "display" of such data, and the devices that utilize such data may be referred to as "display devices" or "receiving devices".

In such a network, there may be a need to synchronize the display of data. The synchronization quality will depend on the use of such data and the sensitivity of the recipients to mismatched displays. A common scenario within this environment is the delivery of multiple media streams from a single source to multiple destinations with the requirement that their display be synchronized. If the receiving devices are displaying the media data and the displays are within viewing or hearing of each other, the synchronization may be required to be close enough that a human viewer or listener does not detect the difference in display times between the display devices.

For example, a video server may transmit a stream to an audio receiver for surround sound decoding and to a separate digital television for video display. In this case, proper lip synchronization must be maintained between the devices for proper display. A second example is the distribution of the same media stream to multiple digital televisions. In this case, the audio and video decoding for each stream may be accomplished within a single device, which would ensure proper lip synchronization for the devices, but the multiple displays must coordinate with each other to ensure that all streams are synchronized together.

However, synchronization generally requires relatively close coordination and communication between devices. This synchronization process may require significant overhead in messaging and processing. A limited network, such as a network that interconnects low-resource devices, including personal entertainment devices, may have difficulty to providing such inter-device coordination and communication.

SUMMARY OF THE INVENTION

A method and apparatus are provided for synchronizing related data streams in interconnection networks.

In a first aspect of the invention, an apparatus includes a transmitter to transmit a data stream to a second apparatus, where the transmitter is to transmit a data packet to the second apparatus. The apparatus further includes a clock, with the apparatus providing a first timestamp for the data packet upon transmission of the data packet. The apparatus is to provide a second timestamp upon receiving a returned packet from the second apparatus, with the returned packet containing timestamps for the receipt and transmission of the packet by the second apparatus. A network unit is to determine a start time for decoding of the data stream by the second apparatus based at least in part on the timestamps for the packet.

In a second aspect of the invention, an apparatus includes a receiver to receive a data stream from a second apparatus and a clock, with the apparatus providing a first timestamp upon receiving a synchronization packet from the second apparatus and a second timestamp upon transmission for the returned synchronization packet. The apparatus includes a buffer to hold data of the data stream, the buffer to begin draining when a start time for the data stream from the second apparatus is reached. The apparatus further includes a decoder to decode the data stream.

In a third aspect of the invention, a method for synchronizing related data streams includes preparing a packet to transmit to a first receiving device, where the first receiving device to receive at least a first data stream of the related data streams. A first timestamp is provided upon transmitting the packet and a second time stamp is provided upon receiving a returned packet, where the returned packet further includes timestamps for the receipt of the packet by the first receiving device and the transmission of the returned packet by the first receiving device. A first starting time for the first receiving device is determined based at least in part on the timestamps of the packet and returned packet.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to synchronizing related data streams in interconnection networks.

As used herein, "related data streams" means multiple versions of the same data stream or different data streams that are related to each other in any way. In one example, a single video data stream directed to multiple display devices would provide related data streams. In a second example, a video data stream and an audio data stream directed to the same or different display devices comprise would provide related data streams.

As used herein, "entertainment network" means an interconnection network to deliver digital media content (including music, audio/video, gaming, photos, and others) between devices. An entertainment network may include a personal entertainment network, such as a network in a household, an entertainment network in a business setting, or any other network of entertainment devices. In such a network, certain network devices may be the source of media content, such as a digital television tuner, cable set-top box, video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions. In some embodiments, the network devices may be co-located on a single local area network. In other embodiments, the network devices may span multiple network segments, such as through tunneling between local area networks. The entertainment network may include multiple data encoding and encryption processes.

In some embodiments, multiple related data streams in a network are synchronized. In some embodiments, the data streams are synchronized by determining a phase difference between the transmitting and each receiving device, and adjusting the operation of each receiving device based at least in part on the applicable phase difference. In some embodiments, the phase difference between a transmitting device and a receiving device is determined at least in part by sending a data packet to the receiving device and receiving a returned data packet, and utilizing timestamp data gathered for the data packet. In some embodiments, synchronization of data streams further utilizes information regarding receiving device operation.

In some embodiments, a process is provided for maintaining stream synchronization such that the quality is sufficient for human use or operation, while minimizing complexity of the process. In some embodiments, a synchronization process is provided to enable its implementation within low-resource devices, such as single-chip solutions.

Figure 1:
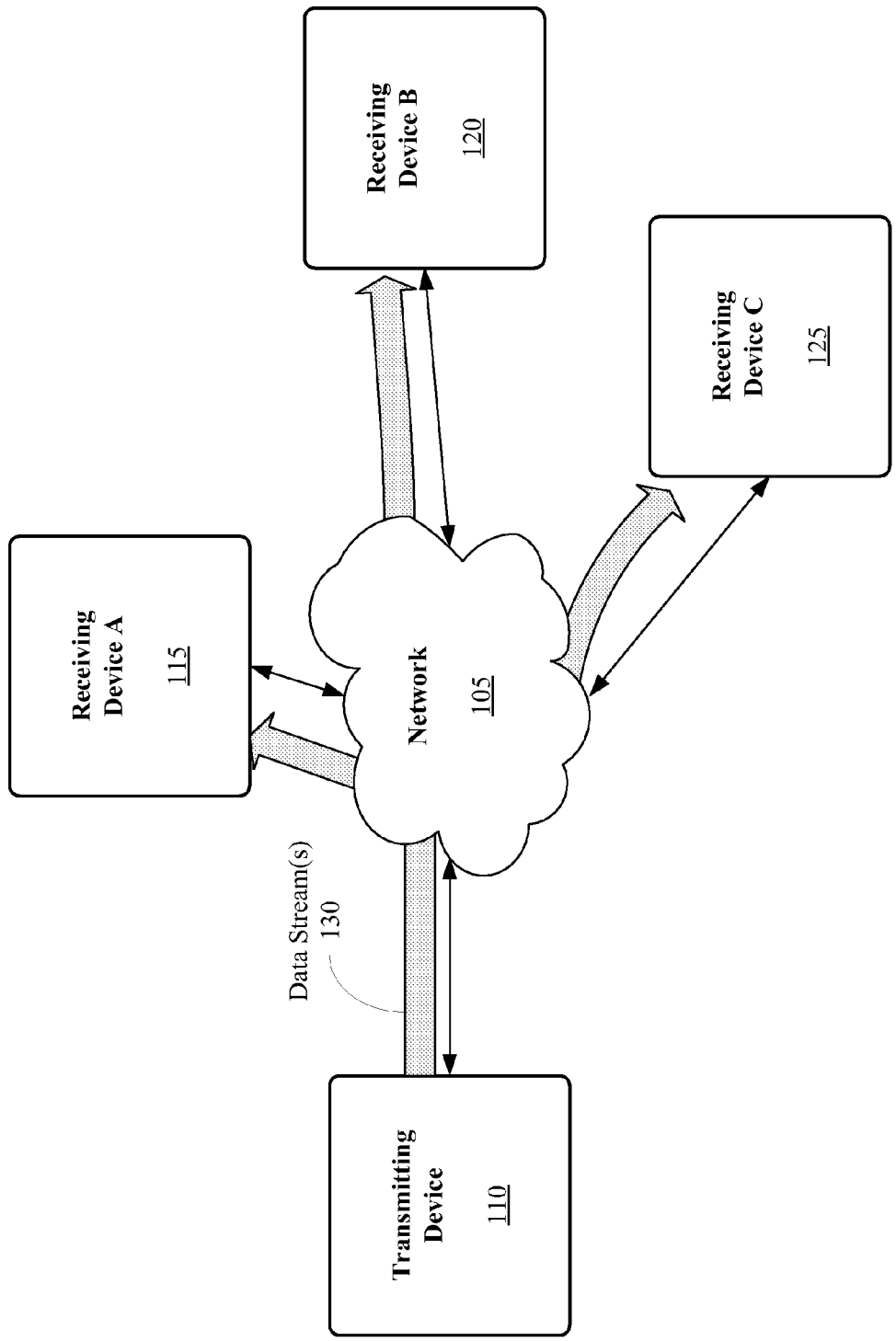
FIG. 1 is an illustration of an embodiment of a data stream delivered to multiple receiving devices.

FIG. 1 is an illustration of an embodiment of a data stream delivered to multiple receiving devices. In this illustration, a network 105 may include multiple devices, and related data streams may be transferred between such devices. The data streams may include, but are not limited to, media stream data. For example, there may be a request for a transmitting device 110 to deliver a particular data stream or streams 130 to multiple receiving devices, such as receiving device A 115, receiving device B 120, and receiving device C 125. The data stream or streams 130 may be, in on example, an audio visual data stream to be displayed in multiple locations, or may include an audio stream and a video stream to be displayed together. If the locations are close enough in proximity to be observed by one person, then the person will notice if the displays are not synchronized. However, the devices may differ, and the distances to each device may differ. For this reason, there will generally be a phase difference of unknown size between the receiving devices. In some embodiments, a process or system provides for synchronization of the data stream for each receiving device.

In some embodiments, a system may utilize a "push model" for data streaming. In some embodiments, a single source may be delivering a media stream to a single destination over an interconnection network. In this circumstance, there are three clock domains involved: the transmitter clock, the receiver clock, and the decoder clock. In a push model embodiment, the transmitter may send the media stream at a known rate to the receiver without regard to other devices (thus pushing the data to the receiver), with no feedback required from the receiver. The receiver maintains a buffer for the incoming stream to absorb variable latency through the network and forwards the stream data to the decoder, which recovers a clock from the stream and locks its clock to via standard PLL and VCO techniques. This clock recovery is based on the rate at which the receiver delivers the stream data to the decoder, which is in turn based on the stream rate and the receiver's local clock.

In this example, in order to enable the decoder to properly recover the clock from the stream, the receiver implements a "leaky bucket" process or similar process. As stream packets arrive from the network, they are buffered by the receiver (to absorb network jitter), and then are delivered to the decoder at a uniform rate according to its local clock. Because the receiver clock will differ from the transmitter clock, the rate at which the receiver drains the buffer is periodically adjusted. Without such adjustment, the buffer will eventually underflow or overflow.

In some embodiments, standard rate matching techniques may be employed to control the rate at which the receiver's buffer is drained, with a variety of techniques being possible. In this process, the buffer depth is monitored, and a smoothing function applied. Over time, the effective result is that the receiver's clock frequency is matched to the transmitter's clock frequency. This ensures that the receiver will play back the stream at the rate determined by the transmitter without requiring feedback or communication between the receiver and the transmitter.

In some embodiments, the size of the receiver buffer may be adjusted for varying conditions. The size of the buffer will determine the amount of network jitter that can be absorbed, as well as the time period over which the rate-matching algorithm is effective. Larger buffers may provide better results for absorbing network variations, but this advantage occurs at with the cost of initial latency in operation. Thus, the buffer size is a design trade-off.

In some embodiments, a phase relationship between devices, such as displays, is addressed. The push model described above for transmitting a data stream, such as a media stream, from a single source to a single destination provides for the three clocks (transmitter, receiver, and decoder) to be effectively locked to the same frequency, thus ensuring smooth decoding and playback. If the transmitter then delivers the same stream (or different portions thereof) to multiple destinations, the rates of all the clocks will lock to the same frequency in the same manner as in the single destination case. Thus, the streams will not drift apart over time.

However, the clock phases for the devices will differ. In particular, each stream may begin decoding at a different point in real time, depending on the time of receipt of the first packet, the buffering latency, and the decoder latency. In some embodiments, an additional mechanism is provided to ensure that the receivers of all related stream begin decoding at the same time. This requires the determination of the phase offset of the receiver clocks from the transmitter.

A clock synchronization technique, such as NTP (Network Time Protocol) or Ethernet AV (audio video), can be used to set all clocks to have the same phase, but because only the initial offset is important for a data stream (because rate-matching to the source prevents long-term drift), this is not necessary. In some embodiments, the phase difference is assessed by a simple sequence of timed packet exchanges between the transmitter and each receiver. Determining the instantaneous phase difference at the time the stream is initiated is sufficient to ensure proper synchronization between multiple streams.

Figure 2:
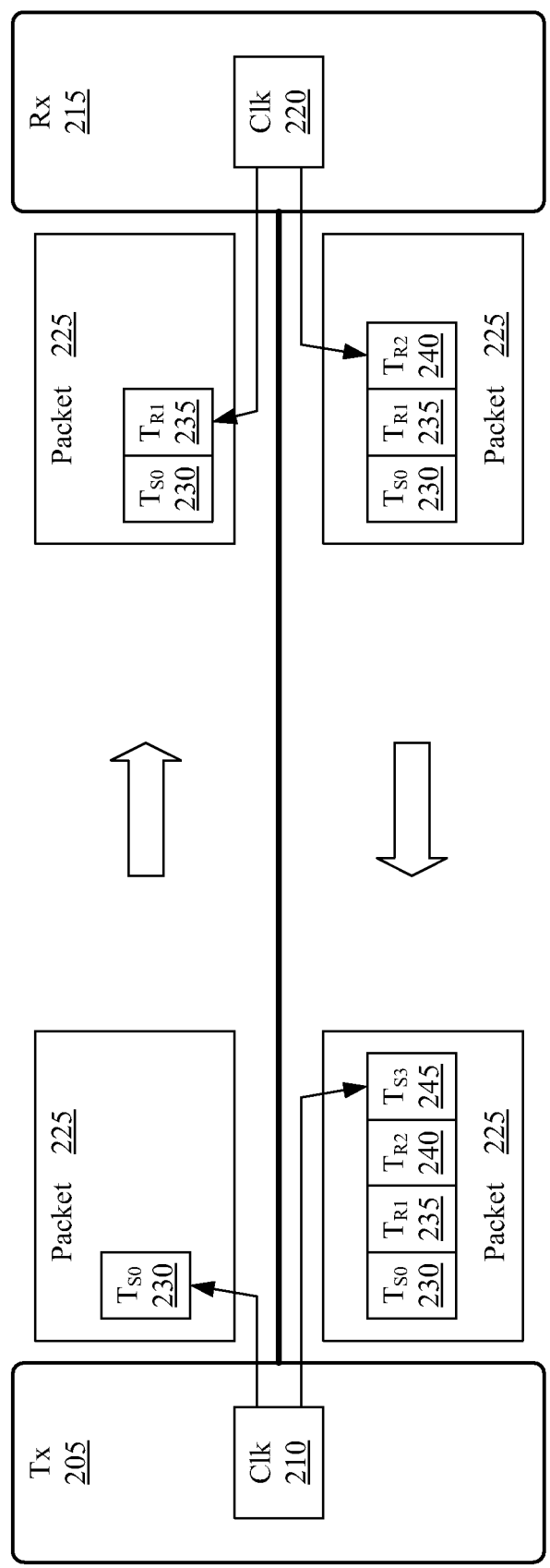
FIG. 2 is an illustration of an embodiment of a process for determining a phase relationship.

FIG. 2 is an illustration of an embodiment of a process for determining a phase relationship. In this illustration, a transmitter 205 has a local clock 210, and a receiver 215 has a local clock 220. In some embodiments, the transmitter 205 sends a packet 225 to the receiver 215. The transmitter 205 inserts a timestamp, $T_{s0}$ 230, according to its local clock 210 as the packet 225 departs. When the packet 225 arrives at the receiver 215, a new timestamp, $T_{r1}$ 235, according to the receiver's clock 220 is inserted into the packet 225. The packet 225 is then sent back to the transmitter 205, and a third timestamp, $T_{r2}$ 240, is inserted according to the receiver's local clock 220 as the packet 225 departs. Finally, when the packet 225 arrives back at the transmitter 205, a fourth timestamp, $T_{s3}$ 245, is noted, according to the transmitter's clock 210. In some embodiments, these values may be used at least in part to determine the phase difference between the two clocks.

Modern clocks, such as those utilized in network devices, are highly precise and typically differ from the nominal frequency by no more than 100 ppm (parts per million), which implies a maximum skew of about 100 μs/sec. In the context of a data stream such as a media stream, this skew is generally inconsequential and can be safely ignored. Thus, for the purposes of establishing the phase relationship between the two clocks, it is safe to make the simplifying assumption that the frequencies of the two clocks are identical. In particular, the round-trip delay, δ, may be determined as:

$$\delta = (T_{s3} - T_{s0}) - (T_{r2} - T_{r1}) \quad [1]$$

Similarly, the offset of the transmitter's clock relative to the receiver's clock (which is the time added to the transmitter's clock to obtain the equivalent time for the receiver's clock), φ, may be determined as follows:

$$\phi = [(T_{r1} - T_{s0}) + (T_{r2} - T_{s3})]/2 \quad [2]$$

Where the time of the transmitter is converted to the time of a particular receiver by:

$$T_{Tx} + \phi_{Rx} = T_{Rx} \quad [3]$$

In an embodiment, the determination of the phase offset is based on the assumption that the round-trip delay, δ, is symmetric. However, in practice, network jitter is unpredictable, and so the phase offset is accurate to within δ/2, half of the round trip delay. For media stream synchronization other than tightly-coupled audio, such as stereo sound, humans generally find up to 80 ms skew tolerable. Thus, provided that δ/2<80 ms, the phase offset will yield acceptable performance. Because phase offsets are determined in this process between the transmitter and each receiver, and not between receivers, the maximum skew between receivers is additive. Thus, acceptable stream synchronization between receivers can be achieved when the round-trip delay is less than half the human tolerance threshold, and thus δ/2<40 ms.

In some embodiments, utilizing the above information, the procedure for determining the phase offset between the transmitter and each receiver is repeated until the round-trip delay is within a proper range. In implementations in which the target environment is a local network, the repetition of the phase determination is a minor constraint in practice and is needed only to address transient bursts or noise.

A final component of the phase offset of the receiver's clock relative to the transmitter is the latency through the media stream decoder (latency being the time period that a data packet is held by the media stream decoder before forwarding the resulting data) at the receiver. For example, an MPEG (Moving Picture Experts Group) decoder may add additional latency due to its internal buffering requirements. In some embodiments, in order to account for this extra delay, the receiver includes this value in its responses to the timed packet requests.

The processing overhead of the timed packet requests in the transmitter and receiver can be highly variable. Therefore, in some embodiments a system or process will implement a timed packet responder as a hardware state machine with bounded and known delay. In a similar manner, packet ingress and egress timestamps at the transmitter may be generated by hardware to improve the accuracy of the timestamps. In embodiments in which the generation of timestamps is not performed by hardware, additional error compensation is required when determining the phase offset between clocks. However, in embodiments in which error is only required to be bounded within human tolerance (such as the tolerance of humans to phase differences in sound), hardware support may not be required.

In some embodiments, having knowledge of the phase difference between each of the receiver clocks along with the added decoding latency, the transmitter can determine with significant accuracy when to instruct each of the receivers to begin decoding their respective streams in order to match the displays or other use of the data stream. However, in general each receiver will have different buffering requirements for absorbing network latency. In some embodiments, the transmitter will set a future decode time for receivers to account for the maximal decoder latency of the receiver.

Figure 3:
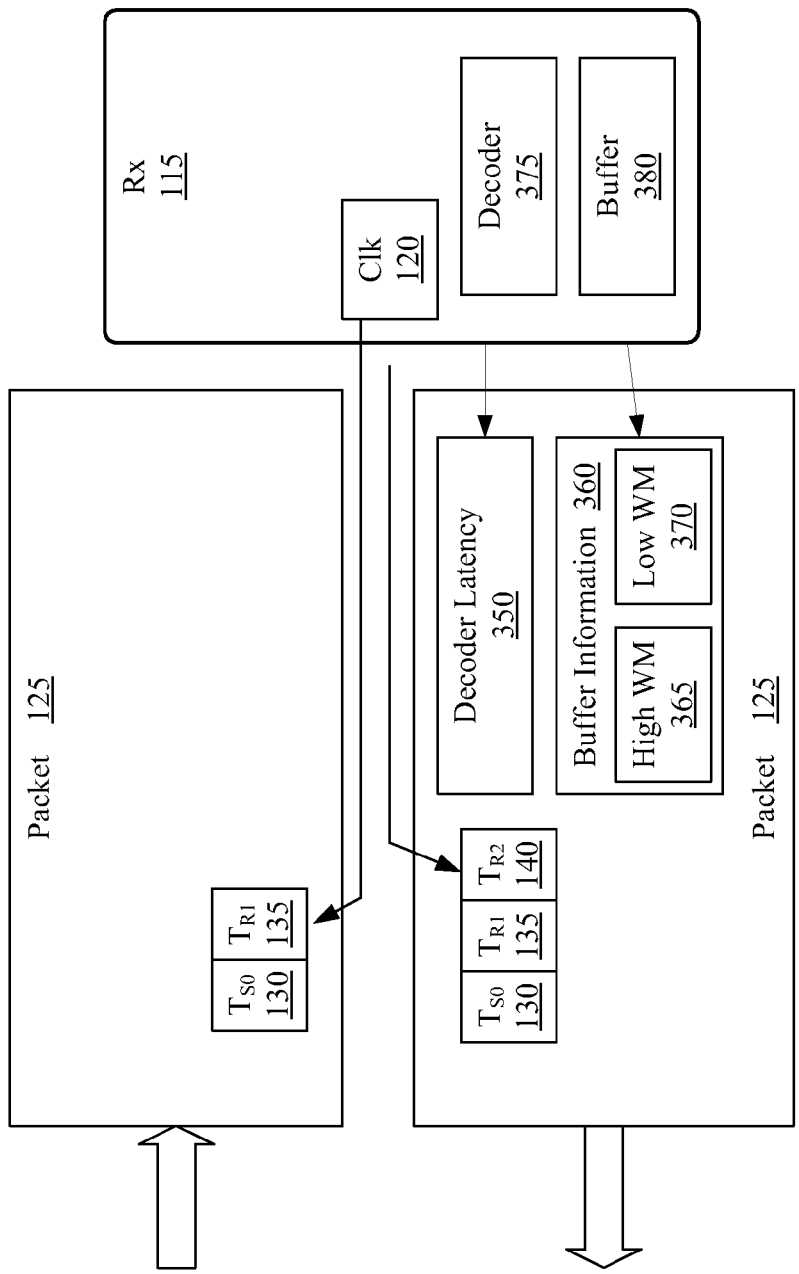
FIG. 3 illustrates data provided by a receiving device for synchronization in some embodiments.

FIG. 3 illustrates data provided by a receiving device for synchronization in some embodiments. In some embodiments, together with the clock timestamps and decoder latency, each receiver includes its buffer information in its response to the timed packet requests. This includes a minimum value, or low water mark, the minimum amount of stream data that must be buffered before decoding can begin, and a maximum value, or high water mark, the maximum amount of stream data that can be buffered.

For example, FIG. 3 again illustrates receiver 115 with local clock 120. In some embodiments, the receiver 115 is receiving a packet 125 which contains a transmission timestamp, $T_{s0}$ 130, as provided by the transmitter. As the packet 125 arrives at the receiver 115, a new timestamp, $T_{r1}$ 135, according to the receiver's clock 120 is inserted into the packet 125. In some embodiments, the receiver 115 provides a latency value 350 for a decoder 375 (indicating the time period that the decoder will hold a data packet before forwarding the resulting data) of the receiver 115. In some embodiments, the receiver 115 further provides buffer information 360 to describe the buffer 380 of the receiver 115. The invention provided may include a high water mark 365 (maximum amount of stream data that can be buffered) and a low water mark (minimum amount of stream data that must be buffered before decoding can begin). The packet 125 is then sent back to the transmitter 105, and another timestamp, $T_{r2}$ 140, is inserted according to the receiver's local clock 120 as the packet 125 departs.

In some embodiments, in order to synchronize all receivers, a transmitter sets an initial decode time for a receiver. In some embodiments, the decode time is based on the current time, a network latency time sufficient for all of the receivers, a time required to fill the buffers of all of the receivers to levels that are sufficient to commence processing, and a time to fill the buffers of all the receivers to levels that are sufficient to provide for decoder latency. In some embodiments, the decode time is determined to be the current time plus half the maximum round-trip delay across all receivers (to account for the expected network latency), plus the time it takes to fill buffers to the maximum low water mark of all receivers, plus the time it takes to fill buffers to the maximum decoder latency of all receivers.

$$T_{DECODE} = T_{CURRENT} + \delta_{Max}/2 + T_{MaxLowWM} + T_{MaxDecLat} \quad [4]$$

The time $T_{DECODE}$ is determined in Equation 4 relative to the transmitter's clock. The value will be converted to the equivalent time for each receiver's clock, pursuant to Equation 3.

If buffer support at the receivers allows, additional initial latency may be added to help reduce the margin of error. In an embodiment, if the start time corresponds to buffer requirements that exceed a high water mark, the stream is aborted, or the requirements can be relaxed at the risk of reduced synchronization performance.

In some embodiments, the transmitter determines a start time according to each receiver clock, where the start time is the $T_{DECODE}$ value obtained from Equation 4 plus the appropriate offset for the given receiver:

$$T_{START} = T_{DECODE} + \phi \quad [5]$$

The transmitter initiates the data stream by sending each receiver the start time (according to the receiver's clock), the sequence number of the first packet, and the packet rate, followed by the stream data. In this process, the transmitter is to ensure that the stream initiation information is reliably delivered to the receiver to ensure proper decoding and synchronization.

In some embodiments, each receiver that is receiving the data stream buffers the incoming stream until the start time arrives according to the clock of the receiver, and at this point the receiver begins draining its buffer and delivering the stream data to the decoder. The receiver behavior then proceeds as described above. If some stream data packets are lost from the beginning of the stream, the receiver can determine how long to delay before beginning to decode the stream based on the stream packet rate and the first available sequence number.

Figure 4:
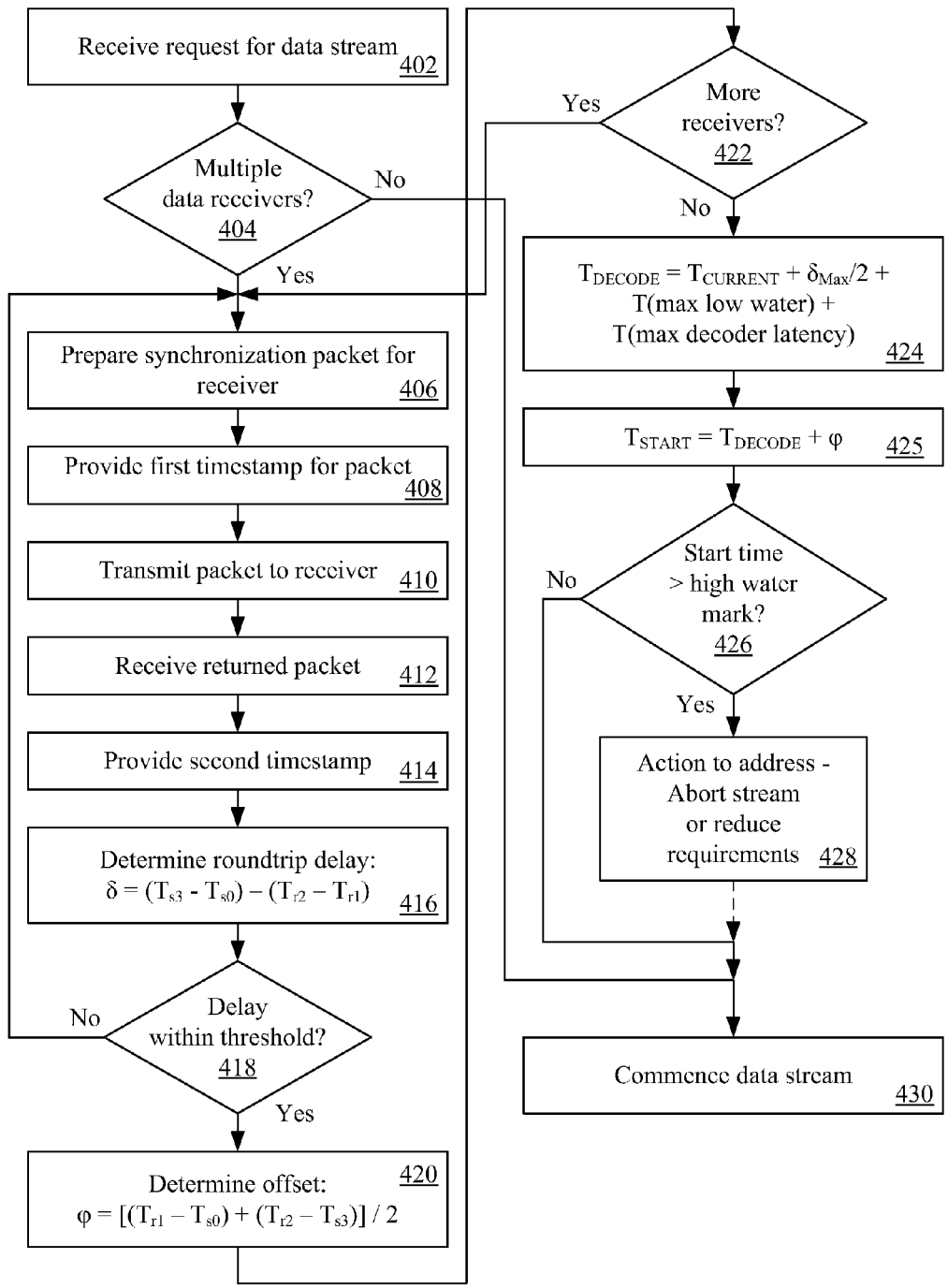
FIG. 4 provides a flow chart to illustrate an embodiment of a process for a transmitter to synchronize related data streams.

FIG. 4 provides a flow chart to illustrate an embodiment of a process for a transmitter to synchronize related data streams. In this illustration, a request may be received for a data stream. If there are not multiple data receivers for related data streams 404, then in some embodiments the transmitter may commence the data stream 430 without synchronization. If there are multiple data receivers 404, then a process is followed to synchronize the decoding of data. In this process, a synchronization packet is prepared for transmission to a receiver 406. A first timestamp is inserted in the data packet 408 and the data packet is transmitted to the receiver. The transmitter then receives the returned packet 412 from the receiving device, while providing a second timestamp as the packet is received 414. The data packet further includes timestamps from the receiving device for the arrival and transmission of the packet, and may further include decoder latency information and buffer information. Utilizing such data, the transmitter may determine that the roundtrip delay for a receiver is equal to the time difference between the transmission and arrival of the data packet at the transmitter, minus the difference between the arrival and transmission of the data packer at the receiver 416. If the determined delay is not within a threshold 418, this may indicate that varying network jitter is causing extra delay, and the determination of the delay is repeated. If the delay is within the threshold 418, the phase offset may be determined based upon the timestamp values 420. If there are more receivers to be addressed 422, the synchronization process may be repeated 406. Otherwise, the starting time for decoding by each receiver is determined. In an embodiment, a decode time may be determined as the current time plus one-half the maximum round-trip delay for the receiving devices, plus a time for a maximum low water mark for the receiving devices, plus a time for a maximum decoder latency for the receiving devices 424. The starting time for a particular receiving device is then determined as the decode time adjusted by the offset $\phi$ for the receiving device 425. If the starting time for any receiving device is greater than a time for the high water mark for the receiving device (thereby causing an overflow of the buffer), then an action may be taken to address the issue 428, such as, for example, aborting the stream to the particular receiving device or reducing the synchronization requirements. If the receiving devices have useable starting times or the synchronization can be otherwise addressed, the data stream can be commenced for each receiving device 430.

Figure 5:
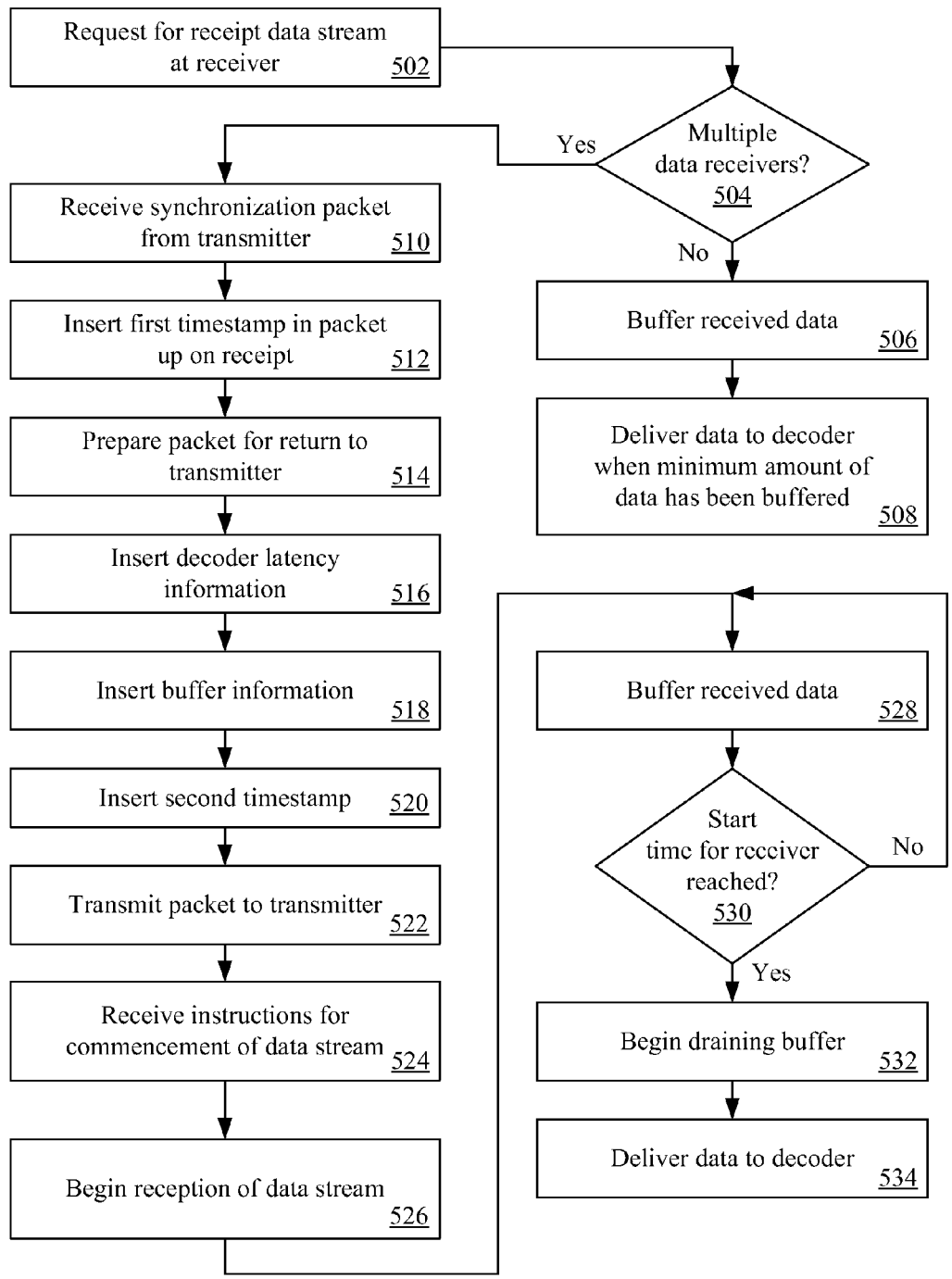
FIG. 5 provides a flow chart to illustrate an embodiment of a process for a receiver to synchronize related data streams.

FIG. 5 provides a flow chart to illustrate an embodiment of a process for a receiver to synchronize related data streams. In this illustration, there may be a request for the receipt of a data stream at the receiver 502. If there are not multiple data receivers for related data streams 504, then in some embodiments the data stream may commence without synchronization, including buffering of the received data 506 and delivering data to a decoder when a minimum amount of data has been buffered 508. If there are multiple data receivers for related data streams 504, then the data receiver will receive a synchronization packet from the transmitter 510. The receiver will insert a first timestamp in the packet upon receipt 512. The receiver will prepare the packet for return to the transmitter 514, and may insert information regarding the latency of the receiver's decoder 516 and information regarding the receiver's buffer 518 into the packet. The receiver will insert a second timestamp 520 as the packet is transmitted back to the transmitter 522.

The receiver will then receive instructions for the commencement of the data stream, including a start time to begin delivering data to the decoder 524. Upon commencement of the data stream 526, the receiver will begin buffering the received data 528. Buffering 528 will continue until the start time for the receiver is reached 530, at which point the receiver will begin draining data from the buffer 532 and delivering such data to the decoder 534.

Figure 6:
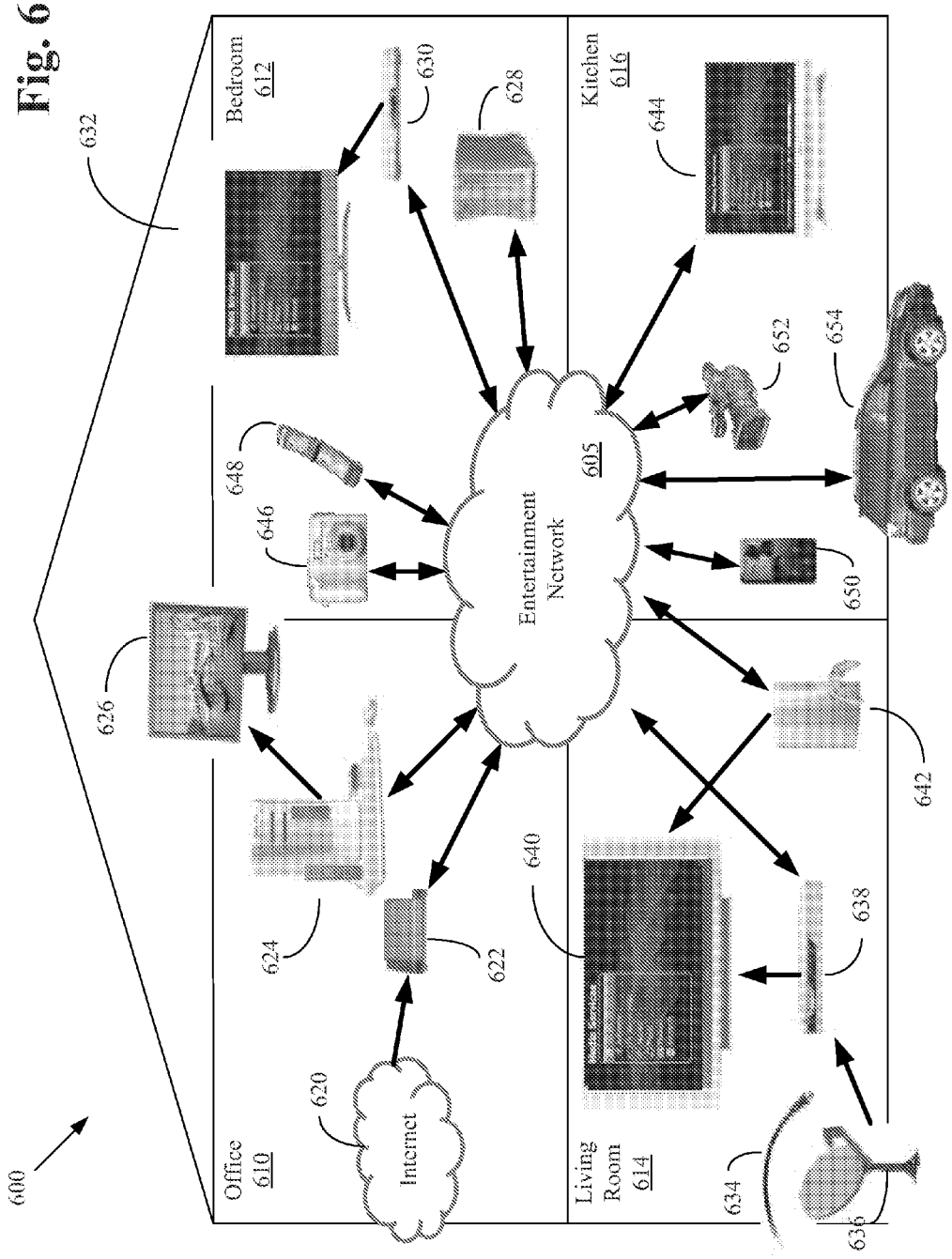
FIG. 6 is an illustration of embodiments of an entertainment network.

FIG. 6 is an illustration of embodiments of an entertainment network. The elements of an entertainment network may be utilized in the synchronization of related data streams to multiple devices. In this illustration, the entertainment network system 600 provides for the connection of any compatible media device to the network. The connection is shown as a connection to entertainment network 605. In some embodiments, the devices operate as network without a central network server. Through the entertainment network, media data streams may be transferred between any of the connected devices. In addition, devices may be controlled remotely through the network. The devices may be connected to the network via any known connector and connection protocol, including coaxial cables, Ethernet cables, and Firewire, and wireless connections via Wi-Fi, Bluetooth, and other wireless technologies.

In some embodiments, the devices may include any media sources or recipients. In FIG. 6, an office 610 may provide an Internet connection 620 via a modem 622 to the network 605. The data received from the Internet may include any streaming media sources, including, but not limited to, purchased audio files (such as downloaded music files), video files (such as movies, television, and other), and computer games. The office 610 may also be connected to a personal computer 624 that utilizes a monitor 626, which may, among other functions, display certain media streams or operate certain computer games.

The entertainment network may also be connected with devices in a bedroom 612, which may, for example, contain a set top box 630 to provide data to a television 632. In addition, the bedroom (or any other space) may contain a media storage unit 628. The media storage unit 628 may receive data from any source connected to the network 605, and may provide data to any data recipient connected to the network 605. The media storage unit 628 may contain any type of media stream data for the network.

The system may further include a living room 614 receiving, for example, input from a cable or fiber system 634 or from a satellite disk network 636. The media input from such sources may be provided to a set top box 638 connected to the network 605 and to a second television 640. Also connected to the network 605 for display on the living room television 640 may be a video game unit 642. There may be any number of other rooms with networked devices, such as a kitchen containing a third television 644 connected to the network 605. Other network devices may also be present, including, but not limited to, a stereo audio system that may include speakers placed throughout the house.

In addition, any number of mobile personal electronic devices may connect to the network. The devices may connect via a cable or via a wireless signal, including, but not limited to, Bluetooth, Wi-Fi, infrared or other similar wireless communication protocol. Each such protocol may require an interface to the network (which are not shown in FIG. 6), such as a Wi-Fi base station. Such mobile personal electronic devices could include a digital camera 646, a cellular telephone 648, a personal music device 650, or a video camera 652. In addition, a mobile system contained in an automobile 654 may connect to the network 605 when the automobile is in close proximity to the network (such as when present in a garage of the house). The mobile personal electronic devices may, for example, automatically connect to the network when within range of the network. While connected, the devices may be available to obtain data through the network or to provide data to the network, including possible automatic updates or downloads to the devices. In one example, a user may be able to access the data contained in any of the mobile electronic devices through the network, such as accessing the photographs stored on the digital camera 646 on the living room television 640 via the set top box 638. In some embodiments, the network devices illustrated in FIG. 6 are low resource devices that have been designed with limited network processing and buffering capabilities.

Figure 7:
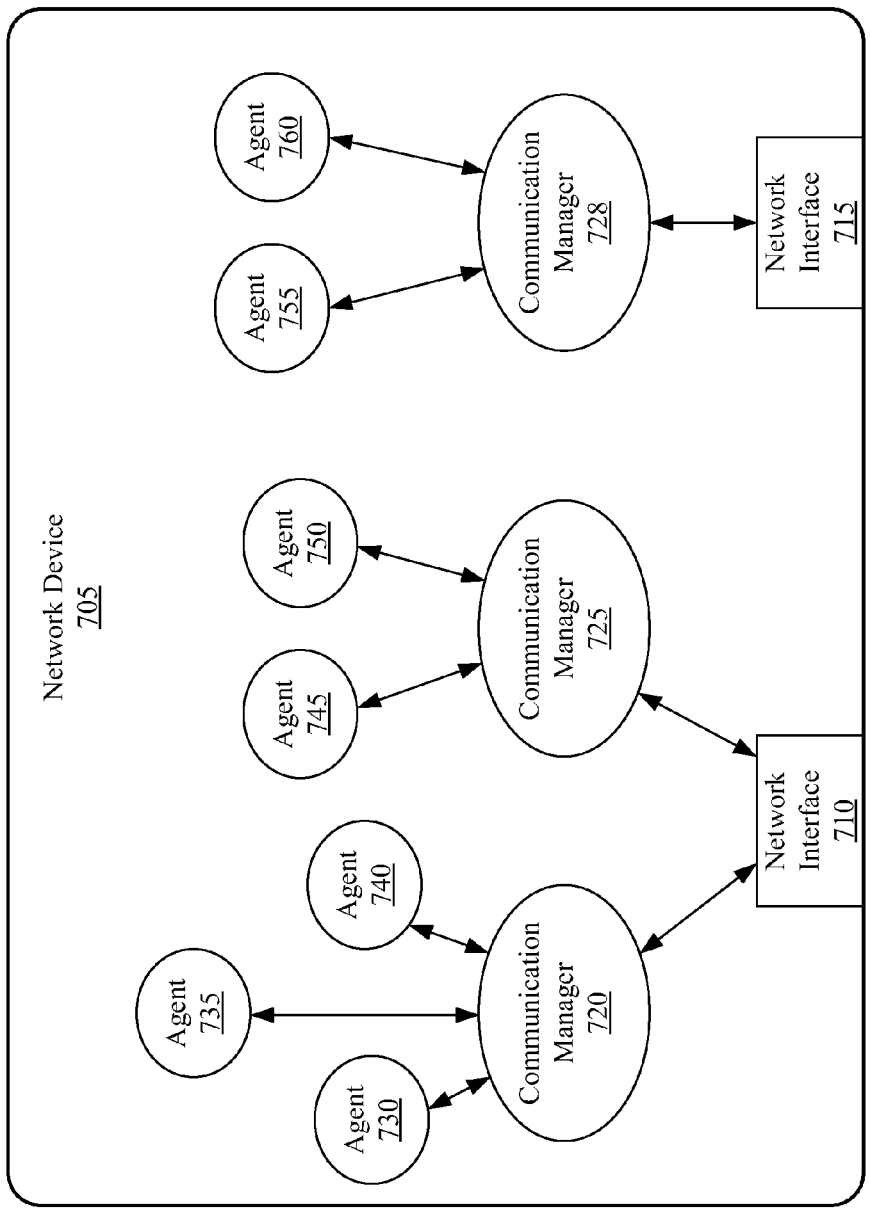
FIG. 7 is an illustration of embodiments of a network device.

FIG. 7 is an illustration of embodiments of a network device. In some embodiments, a network device 705 is an entity with at one physical network interface, such as an Ethernet MAC address. As illustrated in FIG. 7, the network device includes two network interfaces 710 and 715. In some embodiments, network device thus is a physical entity. In some embodiments, the network device includes one or more agents, with each agent being a logical entity that resides on a network device. There may be multiple agents on a network device. For example, FIG. 7 illustrates a network device 705, with network interface 710 providing access to agents 730, 735, and 740 via communication manager 720 and agents 745 and 750 via communication manager 725, and network interface 715 providing access to agents 755 and 760 via communication manager 728. In some embodiments, each agent is assigned a globally unique identifier to distinguish it from other agents, independent of the network device IP address and across device reset operations. In this manner, a command that is intended for agent 755 may be addressed to the unique address for the agent, and the message will then be directed through network interface 715 to agent 755.

In some embodiments, agents serve as endpoints of communication within a network device, and provide a particular set of capabilities and associated behaviors. Agents may include media sources, media sinks, media controllers, and other elements. In one example, an agent may provide a video streaming service. In this example, the agent responds to messages to query and control media streams, and, when instructed, the agent may autonomously deliver a media stream to another agent. In some embodiments, an agent has no more than one active media session at any time, thus providing for relatively simple operation. An agent may be viewed may be described as acting as an active object in that the agent may send and receive messages, modify internal state in response to such messages, and have the ability to perform continuous actions as a side effect.

In some embodiments, an agent may communicate on an entertainment network by way of a communication manager. In some embodiments, there may be one or more communication managers per device, such as communication managers 720, 725, and 730 in FIG. 7. In some embodiments, multiple agents may be managed by a single communication manager, such as, for example, agents 730, 735, and 740 being managed by communication manager 720. In some embodiments, a communication manager is responsible for routing messages to and from the agents that are bound to the communication manager. The process may include delivering messages to other agents that are local to the same network device, multiplexing messages from individual agents onto outgoing connections to agents on remote network devices, and handling broadcast requests. In some embodiments, an agent may be bound to only one communication manager, and a communication manager may be bound to only one network interface.

In some embodiments, a display manager is an agent that manages the resources on a display device. Specifically, the display manager is responsible for granting access to the display resources and screen geometry. In some embodiments, each display device has only one display manager for each related set of I/O devices, such as video output, graphics output, audio output, and user input. In some embodiments, the agent works with a session manager to coordinate the delivery and display of media content at the display device, granting access to the display device resources. In some embodiments, a display manager represents the starting point for a user session and delegate controls to a session manager.

In some embodiments, a session manager is an agent that coordinates a set of media content for an active user. In some embodiments, once selected, a session manager initiates a remote on-screen display session with the corresponding display manager and begins to execute an application program to manage other devices in the network. In some embodiments, a display manager forwards input events to the session manager and grants access rights to its display resources, which a session manager can delegate to other agents, thus allowing the other agents to deliver content to the display. In one example, a display manager may grant access rights to a session manager that executes within a set-top box. The session manager may initiate a remote UI (user interface) session with the display, and allows the user of the network device to select a video to be played from a remote video storage device. In some embodiments, the session manager may pass access rights to a video server, and direct the video server to deliver a media stream to the display. In some embodiments, session managers maintain the states necessary to manage a user's experience in utilizing media content.

Figure 8:
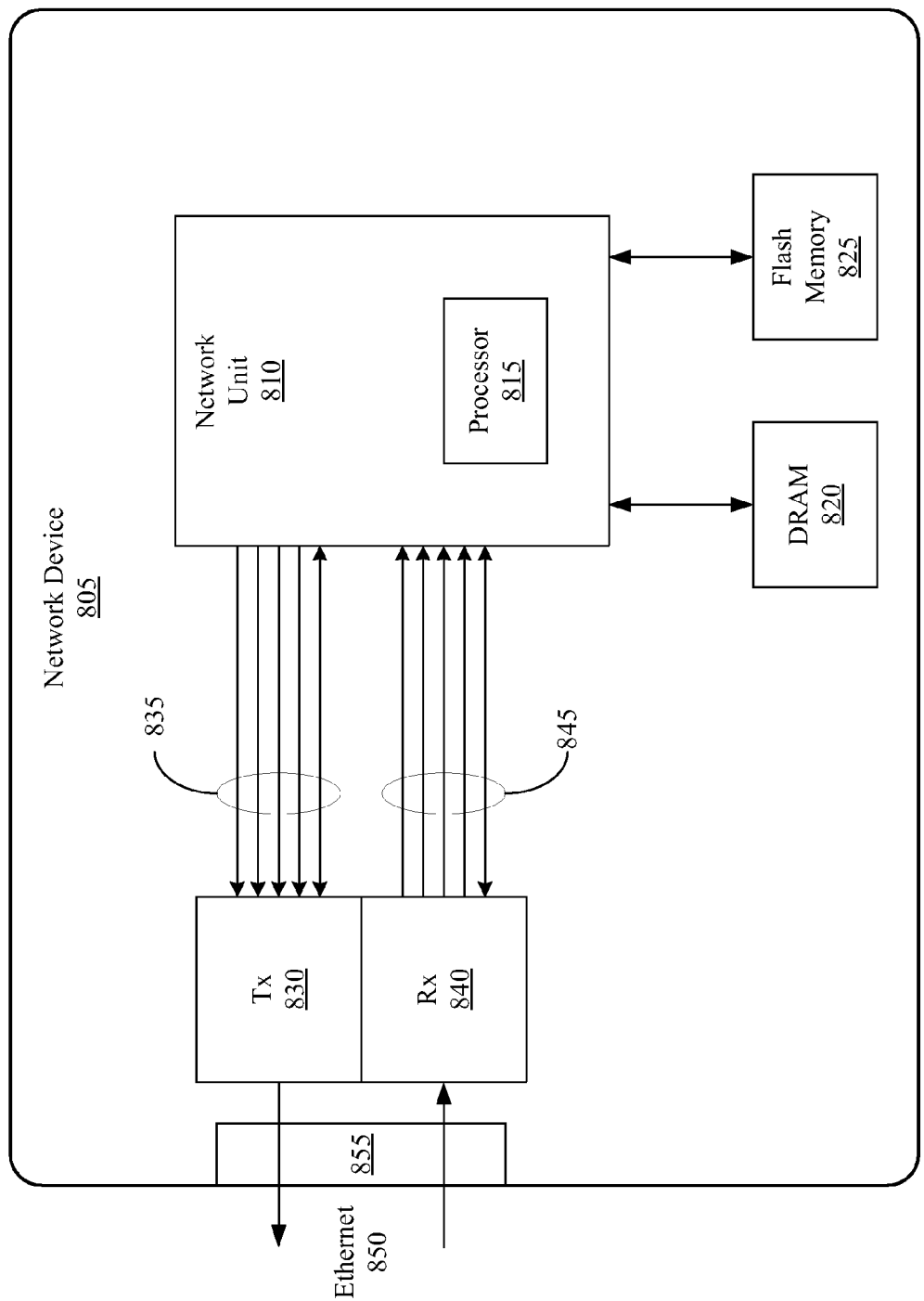
FIG. 8 is an illustration of embodiments of components of a network device.

FIG. 8 is an illustration of embodiments of components of a network device. In this illustration, a network device 805 may be any device in an entertainment network, including, but not limited to, devices illustrated in FIG. 6. For example, the network device may be a television, a set top box, a storage unit, a game console, or other media device. In some embodiments, the network device 805 includes a network unit 810 to provide network functions. The network functions include, but are not limited to, the generation, transfer, storage, and reception of media data streams. The network unit 810 may be implemented as a single system on a chip (SoC) or as multiple components.

In some embodiments, the network unit 810 includes a processor for the processing of data. The processing of data may include the generation of media data streams, the manipulation of media data streams in transfer or storage, and the decrypting and decoding of media data streams for usage. The network device may also include memory to support network operations, such as DRAM (dynamic random access memory) 820 or other similar memory and flash memory 825 or other nonvolatile memory.

The network device 805 may also include a transmitter 830 and/or a receiver 840 for transmission of data on the network or the reception of data from the network, respectively, via one or more network interfaces 855. The transmitter 830 or receiver 840 may be connected to a wired transmission cable, including, for example, an Ethernet cable 850, or to a wireless unit. The transmitter 830 or receiver 840 may be coupled with one or more lines, such as lines 835 for data transmission and lines 845 for data reception, to the network unit 810 for data transfer and control signals. Additional connections may also be present. The network device 805 also may include numerous components for media operation of the device, which are not illustrated here.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
a transmitter configured to transmit a plurality of data streams to a plurality of receiving devices, the transmitter configured to transmit data packets to each of the plurality of receiving devices;
a clock, the apparatus being configured to provide a first timestamp for each of a plurality of data packets transmitted to the plurality of receiving devices using the clock upon transmission of the transmitted data packets;
a receiver to receive returned data packets from the plurality of receiving devices in response to the transmitted data packets, each returned data packet containing a second timestamp for the receipt of the first transmitted data packet by the receiving device and a third timestamp for the transmission of the returned data packet by the receiving device, the apparatus configured to provide a fourth timestamp upon receiving the returned data packet from the receiving device; and a network unit to direct the operation of the apparatus, the network unit to determine a start time for each of the plurality of receiving devices for decoding of the respective data stream of the plurality of data streams that is transmitted to the receiving device, the start time for the receiving device based at least in part on the first, second, third, and fourth timestamps for the returned data packet to the receiving device, wherein the determination of start time for each receiving device includes:

determining a phase offset for the receiving device from the apparatus based on the timestamps of the transmitted data packet to the receiving device and the returned data packet from the receiving device, determining an initial decode time for all of the receiving devices, the initial decode time being based at least in part on round trip delay times for transmission and receipt of data packets for each of the plurality of receiving devices and on decoder latencies for each of the plurality of receiving devices, and adding the phase offset for the receiving device to the initial decode time for all the receiving devices to generate the start time for the receiving device.

2. The apparatus of claim 1, wherein the timestamps for the apparatus are based on the clock of the apparatus and the timestamps of each receiving device are based on a local clock of each receiving device.

3. The apparatus of claim 2, wherein the apparatus is to synchronize decoding of the plurality of data streams at each receiving device using the start times established for decoding of the respective data stream for each of the plurality of receiving devices.

4. The apparatus of claim 1, wherein determination of the initial decode time for the plurality of receiving devices includes determination of a maximum round-trip delay time for the transmission and return of a data packet for the plurality of receiving devices.

5. The apparatus of claim 1, wherein the determination of the phase offset between the apparatus and each receiving device is made by dividing a difference between the second timestamp and the first timestamp for the receiving device plus a difference between the third timestamp and the fourth timestamp for the receiving device by two.

6. The apparatus of claim 1, wherein the determination of the decode time for all of the receiving devices further includes a maximum buffer value based on buffer information for each of the receiving devices and a minimum buffer amount before decoding based on decoder latency information for each of the receiving devices.

7. The apparatus of claim 6, wherein the returned data packet for each receiving device further includes the buffer information for the receiving device.

8. The apparatus of claim 7, wherein the returned data packet for each receiving device further includes the decoder latency information for the receiving device.

9. The apparatus of claim 1, wherein each data stream comprises a stream of media data.

10. The apparatus of claim 1, wherein the plurality of receiving devices do not communicate with each other regarding synchronization of the plurality of data streams.

11. The apparatus of claim 1, wherein a receiving device is to modify a rate of a clock of the receiving device based upon a level of a buffer of the receiving device.

12. A method for synchronizing a plurality of related data streams to a plurality of receiving devices comprising:

preparing a packet to transmit from a transmitting device to each receiving device of the plurality of receiving devices, each receiving device to receive a data stream of the plurality of related data streams;

providing a first timestamp upon transmitting the packet from the transmitting device to each receiving device;

receiving a returned packet from each receiving device in response to the packet sent to the receiving device, the returned packet including a second timestamp for the receipt of the packet by the receiving device and a third timestamp for the transmission of the returned packet by the receiving device;

providing a fourth timestamp upon receiving the returned packet from each receiving device at the transmitting device; and determining, by the transmitting device, a starting time for each receiving device based at least in part on the timestamps of the packet sent to the receiving device and the returned packet from the receiving device, wherein the determination of the starting time for each receiving device includes:

determining a phase offset for the receiving device from the transmitting device based on the timestamps of the first packet and first returned packet, determining an initial decode time for all of the receiving devices, the initial decode time being based at least in part on round trip delay times for transmission and receipt of data packets for each of the plurality of receiving devices and on decoder latencies for each of the plurality of receiving devices, and adding the phase offset for the receiving device to the initial decode time for all the receiving devices to generate the start time for the receiving device.

13. The method of claim 12, further comprising providing for synchronization of the plurality of data streams based on the starting times for the plurality of receiving devices.

14. The method of claim 12, wherein further comprising receiving buffer information and decoder information from each of the plurality of receiving devices, and wherein the determination of the initial decode time for all of the receiving devices includes the buffer information and the decoder information.

15. The method of claim 12, wherein the decode time is based on the current time, a network latency time sufficient for all the receiving devices, a time required to fill buffers of all of the receivers to levels that are sufficient to commence processing, and a time to fill the buffers of all the receivers to levels that are sufficient to provide for decoder latency.

16. The method of claim 12, wherein the plurality of related data streams comprises a plurality of media data streams.

17. The method of claim 16, wherein a first data stream and a second data stream of the plurality of data streams are copies of an audio or a video data stream.

18. The method of claim 16, wherein a first data stream of the plurality of data streams is a video data stream and a second data stream of the plurality of data streams is an audio data stream related to the video data stream.

19. The method of claim 12, wherein the determination of the phase offset between the transmitting device and each receiving device is made by dividing a difference between the second timestamp and the first timestamp for the receiving device plus a difference between the third timestamp and the fourth timestamp for the receiving device by two.

* * * * *